United States Patent
Anderson et al.

(10) Patent No.: US 6,195,193 B1
(45) Date of Patent: Feb. 27, 2001

(54) SEAL FOR ELECTROCHROMIC DEVICES

(75) Inventors: John S. Anderson; William L. Tonar, both of Holland; Kevin L. Ash, Grand Rapids; Thomas F. Guarr, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/540,219

(22) Filed: Mar. 31, 2000

Related U.S. Application Data

(62) Division of application No. 09/158,423, filed on Sep. 21, 1998.

(51) Int. Cl.[7] ................................................... G02F 1/15
(52) U.S. Cl. ........................... 359/265; 359/267; 359/268; 359/272; 359/275
(58) Field of Search ..................................... 359/265–275

(56) References Cited

U.S. PATENT DOCUMENTS

| | | |
|---|---|---|
| 4,558,924 | 12/1985 | Sautter . |
| 5,202,787 | 4/1993 | Byker et al. . |
| 5,233,461 | 8/1993 | Dornan et al. . |
| 5,552,092 | 9/1996 | Francis et al. . |
| 5,724,187 | 3/1998 | Varaprasad et al. . |
| 5,790,298 | 8/1998 | Tonar . |
| 5,910,854 | * 6/1999 | Varaprasad et al. ................. 359/273 |

FOREIGN PATENT DOCUMENTS

| | | |
|---|---|---|
| 0361109 | 8/1989 | (EP) . |
| 0612826 | 2/1994 | (EP) . |
| 56-022413 | 3/1981 | (JP) . |
| 62-133425 | 6/1987 | (JP) . |

* cited by examiner

*Primary Examiner*—Georgia Epps
*Assistant Examiner*—Evelyn A. Lester
(74) *Attorney, Agent, or Firm*—Brian J. Rees; Factor & Partners, LLC

(57) ABSTRACT

An improved seal member is provided as a part of an electrochromic device to bond two glass elements together in a spaced-apart relationship. In one embodiment the seal member provides improved adhesion to a reflector/electrode on the third surface of an electrochromic mirror, or to a layer of metal on the second or third surface for an electrochromic light filter. This seal member comprises a mixture of an organic resin sealing system and an adhesion promoter, where the adhesion promotor comprises a first and a second region, where the first region interacts with the reflector/electrode or the metal layer, and a second region that interacts with the organic resin sealing system, and may even chemically react with the organic resin sealing system. In another embodiment the seal member is provided with a coefficient of thermal expansion that is closer to glass than a standard epoxy sealing system.

23 Claims, 3 Drawing Sheets

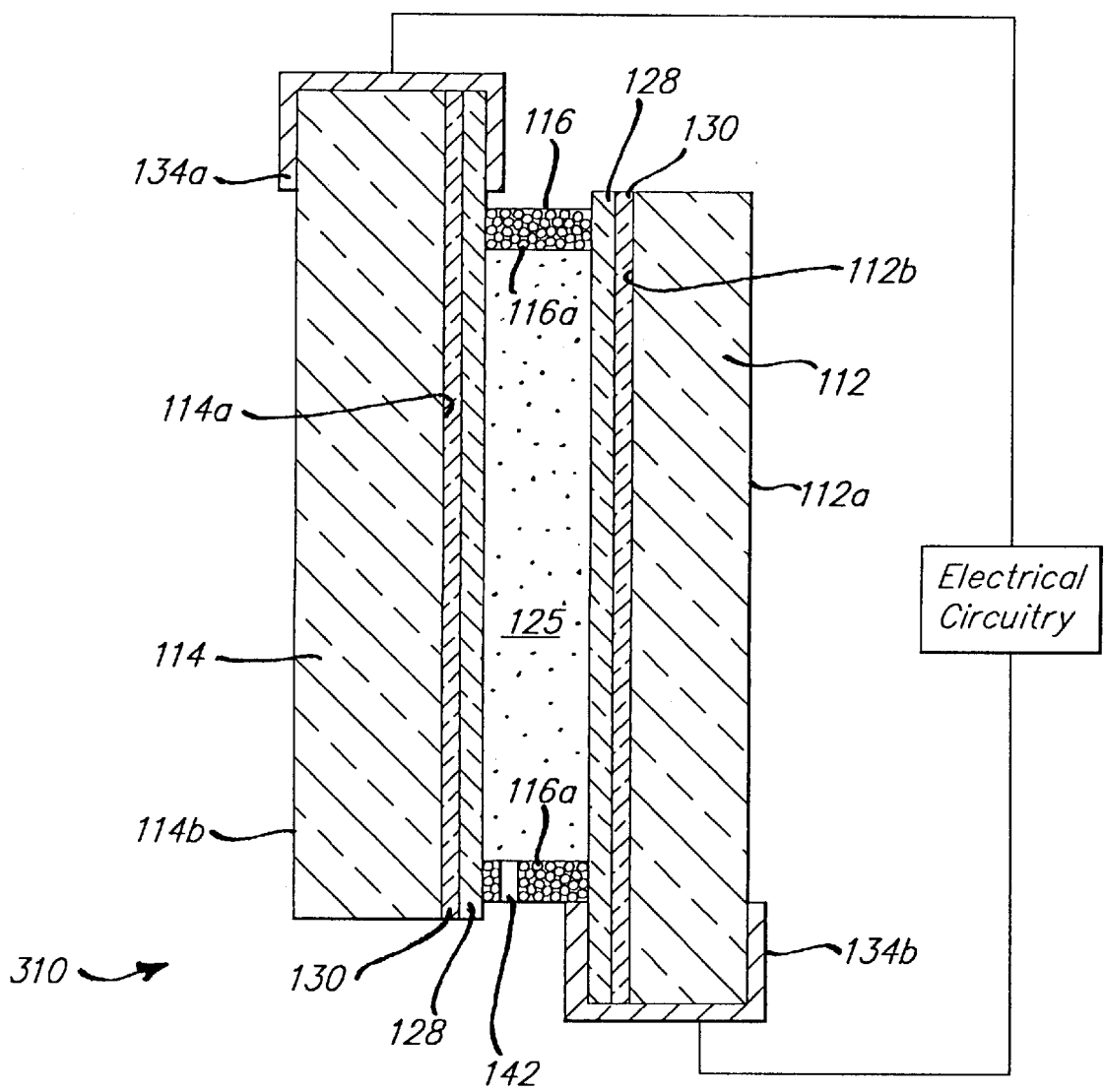
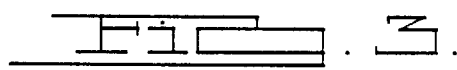

SEAL FOR ELECTROCHROMIC DEVICES

This is a divisional application of U.S. application Ser. No. 09/158, 423 filed on Sep. 21, 1998.

BACKGROUND OF THE INVENTION

This invention relates to electrochromic devices and, more particularly, to electrochromic light filters or windows, as well as electrochromic and rearview mirrors having an improved seal member.

Heretofore, devices of reversibly variable transmittance to electromagnetic radiation have been proposed as the variable transmittance element in variable transmittance lightfilters, variable reflectance mirrors, and display devices which employ such lightfilters or mirrors in conveying information. These variable transmittance light filters have included windows. One commercially available device is an electrochromic mirror for motor vehicles. These electrochromic mirrors change from the full reflectance mode (day) to the partial reflectance mode(s) (night) for glare-protection purposes from light emanating from the headlights of vehicles approaching from the rear. Among such devices are those wherein the transmittance is varied by thermochromic, photochromic, or electro-optic (e.g., liquid crystal, dipolar suspension, electrophoretic, electrochromic, etc.) means and where the variable transmittance characteristic affects electromagnetic radiation that is at least partly in the visible spectrum (wavelengths from about 3800 Å to about 7800 Å).

Devices of reversibly variable transmittance to electromagnetic radiation, wherein the transmittance is altered by electrochromic means, are described, for example, by Chang, "Electrochromic and Electrochemichromic Materials and Phenomena," in *Non-emissive Electrooptic Displays*, A. Kmetz and K. von Willisen, eds. Plenum Press, New York, N.Y. 1976, pp. 155–196 (1976) and in various parts of *Eletrochromism*, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3, 451, 741; Bredfeidt et al., U.S. Pat. No. 4, 090, 358;Clecak et al., U.S. Pat. No. 4, 139, 276; Kissa et al., U.S. Pat. No. 3, 453, 038;Rogers, U.S. Pat. Nos. 3, 652, 149, 3, 774, 988 and 3, 873, 185; and Jones et al., U.S. Pat. Nos. 3, 282, 157, 3, 282, 158, 3, 282, 160 and 3, 283, 656.

In addition to these devices there are commercially available electrochromic devices and associated circuitry, such as those disclosed in U.S. Pat. No. 4, 902, 108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5, 202, 787, entitled "Electro-Optic Device", issued Apr. 13, 1993 to H. J. Byker et al.; U.S. Patent No. 5,204,778, entitled "Control System For Automatic Rearview Mirrors", issued Apr. 20, 1993 to J. H. Bechtel; U.S. Patent No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al. Each of these patents is commonly assigned with the present invention and the disclosures of each, including the references contained therein, are hereby incorporated herein in their entirety by reference. Such electrochromic devices may be utilized in a fully integrated inside/outside rearview mirror system or as separate inside or outside rearview mirror systems.

FIG. 1 shows a typical electrochronic mirror device 10, having front and rear planar elements 12 and 16, respectively. A transparent conductive coating 14 is placed on the rear face of the front element 12, and another transparent conductive coating 18 is placed on the front face of rear element 16. A reflector (20a, 20b and 20c), typically comprising a silver metal layer 20a, covered by a protective copper metal layer 20b, and one or more layers of protective paint 20c, is disposed on the rear face of the rear element 16. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface. The front and rear elements are held in a parallel and spaced-apart relationship by seal 22, thereby creating a chamber 26. The electrochromic medium 24 is contained in space 26. The electrochromic medium 24 is in electrical contact with transparent electrode layers 14 and 18, through which passes electromagnetic radiation whose intensity is reversibly modulated in the device by a variable voltage or potential applied to electrode layers 14 and 18 through clip contacts and an electronic circuit (not shown).

Typically seal 22 is made from an organic material and is used to bond two inorganic glass elements together. This may cause problems ensuring adequate seal integrity over long periods of time because of the difference in the coefficient of thermal expansion (CTE) between the seal and the glass transparent elements. In addition, it is known to place a small percentage of glass beads, e.g., ½ to 2 percent by weight, into the seal as spacers to ensure uniform spacing of the glass transparent elements. This CTE mismatch problem is pronounced (with or without spacer beads) for electrochromic devices that are operated over a wide temperature range, such as architectural windows and automotive windows. Architectural windows must have adequate seal integrity during summer and winter where the temperature may vary by more than 130° F.

Even before a fourth surface reflector electrochromic mirror was commercially available, various groups researching electrochromic devices had discussed moving the reflector from the fourth surface to the third surface. Such a mirror design has advantages in that it should, theoretically, be easier to manufacture because there are fewer layers to build into a device, i.e., the third surface transparent electrode is not necessary when there is a third surface reflector/electrode. In addition, electrochromic windows have been proposed with a very thin layer of metal for use as an electrode on the second surface or third surface or both surfaces. The advantage of using a thin metal layer for use in a light filter or window is that a lower sheet resistance of the electrode can be obtained. In practice, however, placing the thin metal layer on the second or third surface, or the reflector on the third surface, has been difficult. One reason for this difficulty is that the seal used to bond the two pieces of glass together and hold them in a spaced-apart relationship does not always bond well with certain metals, especially reflective and noble metals.

Consequently, it is desirable to provide an improved electrochromic device having a seal that bonds well to a conductive electrode comprising a metal. In addition, it is desirable to provide an electrochromic device having a seal that has a coefficient of thermal expansion that more closely matches the transparent elements.

OBJECTS OF THE INVENTION

Accordingly, a primary object of the present invention is to provide a seal member that bonds well to a layer of metal disposed on the second or third surface of an electrochromic device.

It is a further object of the present invention is to provide a seal member that bonds well to a layer of a noble or reflective metal.

It is yet a further object of the present invention is to provide an electrochromic rearview mirror for motor vehicles incorporating a seal that has improved adhesion to a third surface reflector/electrode.

It is yet a further object of the present invention to provide an electrochromic device having a seal that has a coefficient of thermal expansion that more closely matches the transparent elements.

SUMMARY OF THE INVENTION

The above and other objects, which will become apparent from the specification as a whole, including the drawings, are accomplished in accordance with one aspect of the present invention by providing a seal member that bonds well to a layer of metal on the second or third surface of an electrochromic device. This seal member comprises a mixture of an organic resin sealing system and an adhesion promotor, where the adhesion promoter further comprises a first region that interacts with the layer of metal on the second or third surface, and a second region that interacts with the organic resin sealing system. For electrochromic windows or light filters, the layer of metal is both conductive and transparent in a portion of the electromagnetic spectrum, and is disposed on the second or third surface. For an electrochromic mirror, the layer of metal is a reflector/electrode disposed on the third surface that is both reflective and conductive.

In accordance with another aspect of the present invention, a seal member is provided with an inorganic filler in an amount sufficient to provide a coefficient of thermal expansion that is closer to glass than an organic resin sealing system.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 3 is an enlarged cross-sectional view of an electrochromic device incorporating a seal member comprising an organic sealing system and inorganic beads.

DETAILED DESCRIPTION OF THE INVENTION

Figure 1:
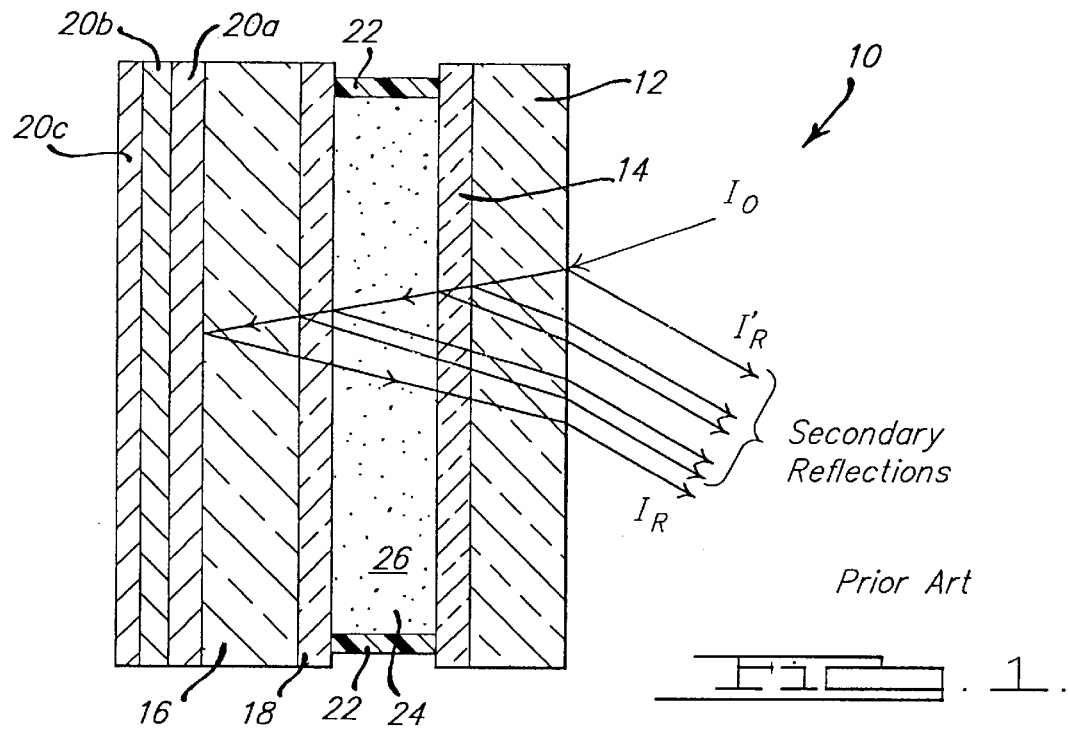
FIG. 1 is an enlarged cross-sectional view of a prior art electrochromic mirror assembly.
Figure 2A:
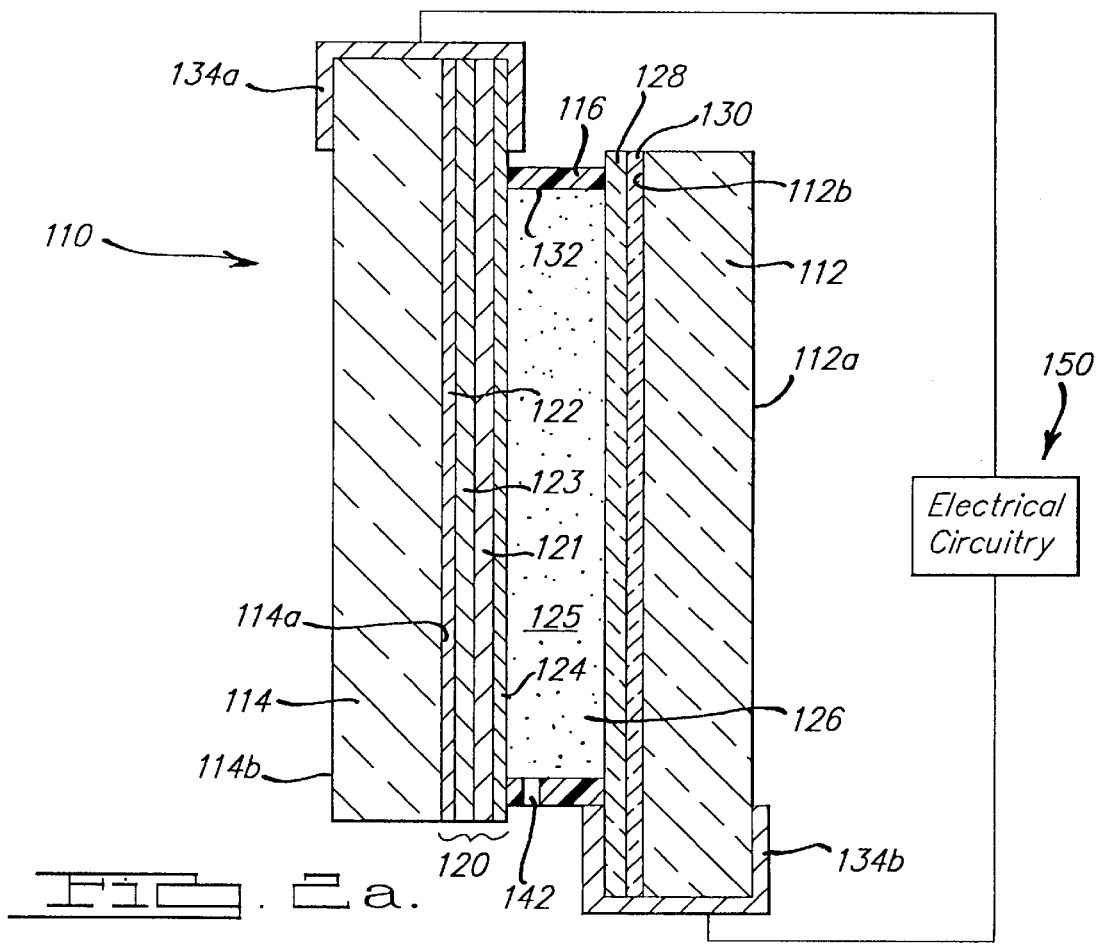
FIG. 2a is an enlarged cross-sectional view of the inside electrochromic rearview mirror incorporating a third surface reflector/electrode.

FIG. 2a shows a cross-sectional view of an electrochromic mirror 110 having a front transparent element 112 having a front surface 112a and a rear surface 112b, and a rear element 114 having a front surface 114a and a rear surface 114b. Mirror 110 may be an inside or an outside mirror. For clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface. These designations should not limit the scope of the invention, in that one may obviously reverse or alter the numbering scheme and not affect the operability of the device. In addition, some of the layers are not drawn to scale in order to aid the viewer. Chamber 125 is defined by a layer of transparent conductor 128 (disposed on second surface 112b), a layer 120 of a reflector/electrode 120 (disposed on third surface 114a), and an inner circumferential wall 132 of scaling member 116.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime glass, float glass or any other material, such as, for example, a polymer or plastic, that is transparent in the visible region of the electromagnetic spectrum. Front element 112 is preferably a sheet of glass. Rear element 114 must meet the operational conditions outlined above, except that it does not need to be transparent, and therefore may comprise polymers, metals, glass, ceramics, and preferably is a sheet of glass.

The layer of a transparent electrically conductive material 128 is deposited on the second surface 112b to act as an electrode. Transparent conductive material 128 may be any material which bonds well to front element 112, is resistant to corrosion to any materials within the electrochromic device, resistant to corrosion by the atmosphere, has minimal diffuse or specular reflectance, high light transmission, near neutral coloration and good electrical conductance. Transparent conductive material 128 may be fluorine doped tin oxide; tin doped indium oxide (ITO); thin layers of gold, silver or silver alloys (as described herein); ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany; zinc indium oxide alloy as disclosed in "Zinc-indium-oxide: A High Conductivity Transparent Conducting Oxide" Tom Fillin, by J. M. Phillips et al., Appl. Phys. Lett. 67 (15) Oct. 9, 1995; and the materials described in above-referenced U.S. Pat. No. 5,202,787, such as TEC 20 or TEC 15, available from Libbey Owens-Ford Co. of Toledo, Ohio. Suitable silver alloys are silver/palladium, silver/gold, silver/platinum, silver/rhodium, silver/titanium, etc. The amount of the solute material, i.e., palladium, gold, etc., can vary. Generally, the conductance of transparent conductive material 128 will depend on its thickness and composition. IMI generally has superior conductivity compared with the other materials. IMI is, however, more difficult and expensive to manufacture and may be useful when high conductance is necessary. The zinc indium oxide has high transmission and low sheet resistance and thus could be very useful in electrochromic devices. One limitation is that to obtain low sheet resistance the thickness of the film may need to be as high as 14, 000 Å. The thickness of the various layers in the IMI structure may vary but generally the thickness of the first ITO layer ranges from about 10 Å to about 200 Å the metal ranges from about 10 Å to about 200 Å and the second layer of ITO ranges from about 10 Å to about 200 Å.

Rather than being a continuous layer, the layer 128 of transparent conductive material may be a metal deposited in a grid, line, dot, checkerboard or similar pattern such that the total area covered by the metallic deposit is substantially less than the geometric area of the transparent element (112 or 114). One important factor is to design the pattern to balance conductivity and visibility. Typically, the area covered by the metal is less than about 50% of the total geometric area of the transparent element (112 or 114) and more commonly the area covered is less than about 20%.

A reflector/electrode 120 is disposed on third surface 114a and comprises at least one layer of a reflective material 121 which serves as a mirror reflectance layer and may also form an integral electrode in contact with and in a chemically and electrochemically stable relationship with one or more of the constituents in an electrochromic medium 126. The reflectance needed from reflective material 121 depends on the final application of minor 110. If mirror 110 is an outside rearview mirror, then reflective material 121 should have a visible reflectance in air of at least about 50%. If mirror 110 is an inside rearview mirror, then reflective material 121 should have a visible reflectance in air of at least about 70%. The reflector/electrode 120 for use on an electrochromic mirror 110 is provided that is made from a single layer 121 of chromium, rhodium, molybdenum, platinum, aluminum, silver or a silver alloy. The reflective silver alloy means a homogeneous or non-homogeneous mixture of silver and one or more metals, or an unsaturated saturated or supersaturated solid solution of silver and one or more metals. The thickness of reflective layer 121 ranges from about 50 Å to about 2000 Å and more preferably from about 200 Å to about 1000 Å. If reflective layer 121 is disposed directly onto the glass surface, it is preferred that the glass surface be treated by plasma discharge to improve adhesion.

Suitable silver alloys are silver/palladium, silver/gold, silver/platinum, silver/rhodium, silver/titanium, etc. The amount of the solute material, i.e., palladium, gold, etc., can vary. The presently preferred materials for highly reflective layer 121 are Ag/Au, Ag/Pt and Ag/Pd.

More typically, reflector/electrode 120 has, in addition to the layer 121 of a reflective silver or silver alloy 121, an optional base layer of a conductive metal or alloy 122 deposited directly on the third surface 114a. Base layer 122 should have a thickness from about 50 Å to about 2000 Å and more preferably from about 100 Å to about 1000 Å. Suitable materials for the base layer 122 are indium-doped tin oxide, fluorine-doped tin oxide, chromium, stainless steel, titanium, and alloys of chromiun/molybdenum/nickel, molybdenum, nickel and nickel-based alloys (commonly referred to as Inconel®, available from Castle Metals, Chicago, Ill.). The main constituents of Inconel® are nickel which may range from 52% to 76% (Inconel® 617 and 600, respectfully), iron which may range from 1.5% to 18.5% (Inconel® 617 and Inconel® 718, respectfully) and chromium which may range from 15% to 23% (Inconel® 600 and Inconel® 601, respectfully). Inconel® 617 having 52% nickel, 1.5% iron, 22% chromium, and typical "other" constituents including 12.5% cobalt, 9.0% molybdenum and 1.2% aluminum was used in the present examples.

In some instances it is desirable to provide an optional intermediate layer 123 between the highly reflective layer 121 and the base layer 122 in case the material of layer 121 does not adhere well to the material of layer 122 or there are any adverse interactions between the materials, e.g., galvanic corrosion. The thickness of intermediate layer 123 ranges from about 50 Å to about 2000 Å and more preferably from about 100 Å to about 1000 Å. Suitable materials for the optional intermediate layer 123 are molybdenum, rhodium, stainless steel, titanium, copper, gold, nickel and platinum.

Finally, it is sometimes desirable to provide an optional flash over-coat 124 over highly reflective layer 121 such that the flash layer 124 (and not the highly reflective layer 121) contacts the electrochromic medium. This flash layer 124 must be sufficiently thin such that it does not completely block the reflectivity of reflective layer 121. Materials suitable for the flash layer are thin (between about 25 Å and about 300 Å, layers of rhodium, platinum, molybdenum or silver alloys.

In some instances it is desirable to mask one or more layers of reflector/electrode 120, such that the reflector/electrode covers a major portion of the transparent element 114a and is removed over a minor peripheral portion. One reason to mask is to remove the portion of reflector/electrode 120 that extends beyond seal member 116 to decrease the chance of corrosion of this exposed portion. This masking may include only one layer of reflector/electrode 120 or may include all layers. If all layers of reflector/electrode 120 are masked, it is desirable to have seal member 116 cover a small portion of the remaining reflector/electrode 120 in order to hide the edge between the masked and unmasked areas.

For a more detailed discussion of reflector/electrode 120, reference is made to U.S. Pat. application Ser. No. 08/832, 587, entitled "Electrochromic Rearview Mirror Incorporating A Third Surface Metal Reflector", which is hereby incorporated herein in its entirety by reference.

If desired, an optional layer or layers of a color suppression material 130 may be deposited between transparent conductive material 128 and the second surface 112b to suppress the reflection of any unwanted portions of the electromagnetic spectrum.

Figure 2B:
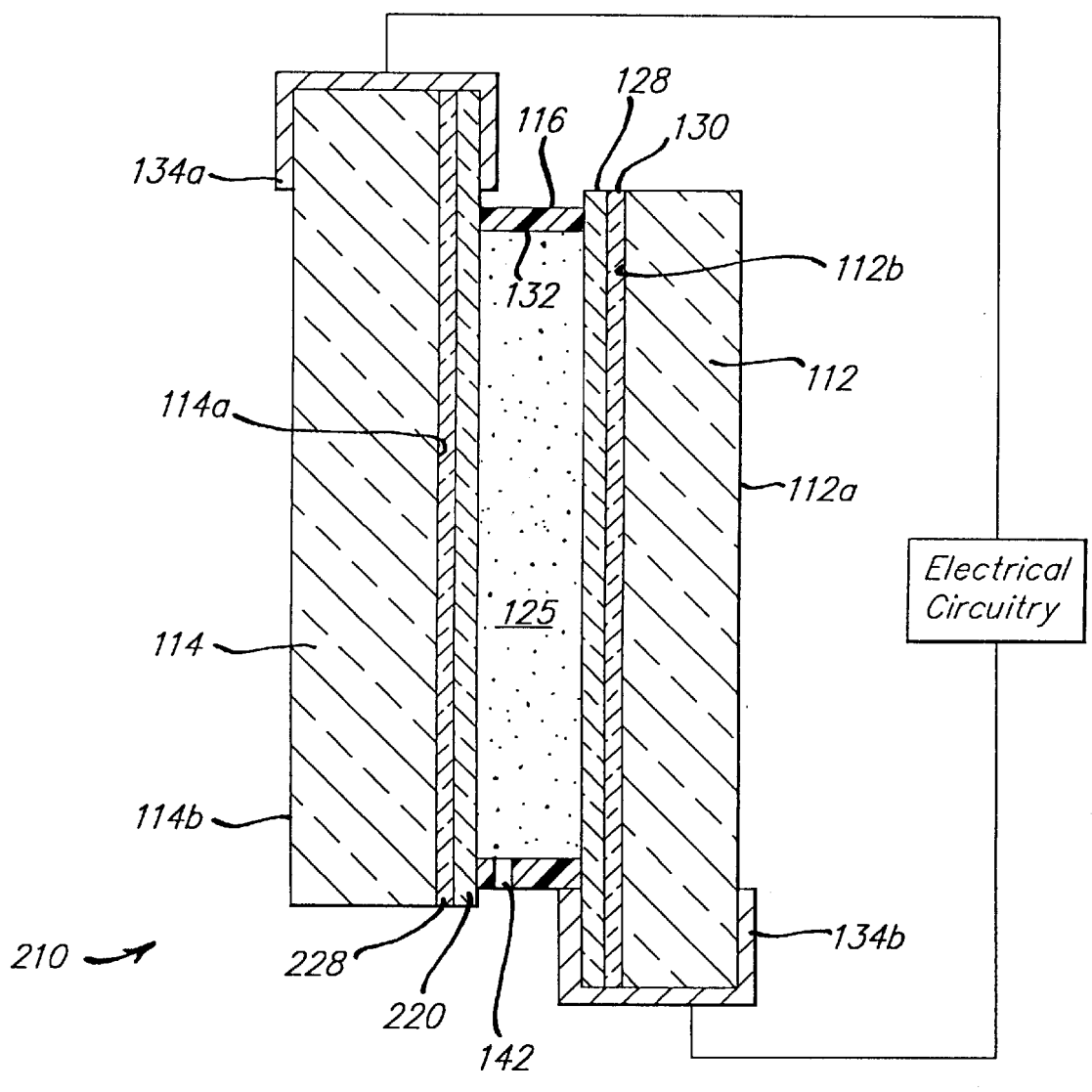
FIG. 2b is an enlarged cross-sectional view of an electrochromic window incorporating at least one layer of transparent conductive material comprising a layer of metal.

FIG. 2b shows a cross-sectional view of an electrochromic window 210 having a front transparent element 112 having a front surface 112a and a rear surface 112b, and a rear element 114 having a front surface 114a and a rear surface 114b, as described for FIG. 2a. As will be clear to those skilled in the art, if the electrochromic device is a window, then the distinction between the second 112b and third 114a surfaces is not critical in that both layer 228 and layer 220 should be transparent in a portion of the electromagnetic spectrum. By transparent we mean that the layers, with the device fully assembled, provide a device with light transmission greater than about 30% in the visible portion of the electromagnetic spectrum. The transparent conductor 228, on either the second surface or the third surface, may be the same as described above for layer 128. The thin layer 220 of metal, illustratively disposed on the third surface 114a, may comprise a thin layer of aluminum, gold, silver, silver alloys, platinum and the like. As stated above, the distinction between the second and third surface is not critical and the only limitation is that layer 220 must be disposed on either the second surface 112b or the third surface 114a, or both surfaces in that layer 228 may also be a thin layer of metal. Whichever surface is coated with layer 220, the total thickness of the layers must be thin enough to allow visible light to be transmitted therethrough, and generally ranges from about 25 Å to about 300 Å.

For either windows or mirrors, the coatings of the third surface 114a are scalably bonded to the coatings on the second surface 112b in a spaced-apart relationship by a seal member 116 disposed near the outer perimeter of both second surface 112b and third surface 114a. Seal member 116 may be any material that is capable of adhesively bonding the coatings on the second surface 112b to the coatings on the third surface 114a to seal the perimeter such that electrochromic material 126 does not leak from chamber 125, or to glass and the above-mentioned layers if the layers on second and/or third surface are masked. The performance of the seal is member is dependent upon how well the seal member bonds or adheres to the layer 120 of metal on the second surface 112b or third surface 114a (for windows), or to the reflector/electrode 120 on the third surface 114a (for mirrors).

The performance requirements for a perimeter seal member 116 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal member can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting or UV curing organic resin sealing systems are preferred. Such organic resin sealing systems for LCD's are described in U.S. Pat. No. 4, 297, 401, 4, 418, 102, 4, 695, 490, 5, 596, 023 and 5, 596, 024.

Because of their excellent adhesion to glass, low oxygen permeability and good solvent resistance, epoxy-based organic resin sealing systems are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The organic sealing resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability and spacers such as glass beads or rods can be used to control final seal thickness and substrate spacing. Suitable epoxy sealing resins for use in a perimeter seal member 116 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R. " 331, 317, 361, 383, 661, 662, 667, 732, 736, "D.E.N." 431, 438, 439 and 444 available from Dow Chemical Co., Midland, Mich.

Suitable epoxy curing agents include V-15, V-25 and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 2049, 352, CG, CG-325 and CG-1200 available from Air Products, Allentown, Pa.

Optional fillers include fumed silica such as "CAB-O-SIL" L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONF SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable precision glass microbead spacers are optionally available in an assortment of sizes from Duke Scientific, Palo Alto, Calif.

Optionally, silane coupling agents that may be incorporated to improve the seal's hydrolytic stability include Z-6020 (which is the same or very similar to A-1120 from Union Carbide), Z-6030, Z-6032, Z-6040, Z-6075 and Z-6076 available from Dow Corning Corporation, Midland, Mich.

In accordance with one aspect of the present invention, seal member 116, in addition to a sealing system, further comprises a component that improves the adhesion between seal member 116 and the metal electrode on the second surface 112b, or third surface 114a, of the electrochromic devices 110 and 210. As stated above, for an electrochromic light filter, the layer 220 of metal is thin and generally transparent in at least a portion of the visible part of the electromagnetic spectrum. For an electrochromic mirror, the reflector/electrode 120 is disposed on the third surface 114a. In either case, the adhesion promoter has at least a first region that interacts with the reflector/electrode 120 (or layer 220 of metal) and a second region, at least a part of which interacts with the seal member 116. The adhesion promoters may be simple chemical compounds or oligomeric or polymeric materials. The exact mode of adhesion promotion can be varied and may consist of chemical and physical interactions. The interaction with the seal member may occur through a chemical reaction with the functional groups of the seal member, or may be of a more complex physical nature in which a pendant chain or chemical group extends for some distance into the seal member 116 providing an anchoring point for the seal member 116.

The adhesion promoter should be uniformly dispersed through out the seal member 116. In the case where the adhesion promoter is solid it may be necessary to grind or mill the solid particles of adhesion promoter in the sealing member 116. A uniform dispersion of small particles is generally desirable. The grinding can be done with mortar and pestle or on equipment such as a three roll mill that is commonly used in the adhesive and paint industry. Alternatively, the adhesion promoter may be pre-reacted with the epoxy resin of the sealing system prior to blending the epoxy resin with the curing agent, filler, silane, etc. This is accomplished by heating a given amount of the adhesion promoter with the epoxy resin until the optional epoxy-reactive functional groups have reacted with the epoxy resin. Care must be taken not to heat the mixture to such a point that homopolymerization of the epoxy resin begins. The reaction can be monitored via FTIR or other suitable instrumentation.

The first region interacts with the one or more layers 120 of metal, whether the metal is a transparent conductor for windows or a reflector/electrode for mirrors, to improve the adhesion of the seal member to the upper-most metal layer. This upper-most layer of metal of the reflector electrode 120 may be either the reflective layer 121, the flash layer 124, or it may be the base or intermediate layers when a portion of the reflector/electrode is masked. As stated above, if the entire reflector/electrode 120 is masked, the seal member overlaps with a portion of the reflector/electrode 120 and thus the first region interacts with the reflector/electrode in this overlapped portion. For the layers of reflective material, e.g., silver, or silver alloys of gold, platinum or palladium, the first region of the adhesion promoter should be a phosphorous and/or sulfur containing moiety such as a phosphine, thiol, dithiol, thioacid, thioether, thioamide, thioester, sulfide, disulfide and tetrasulfide. Although not wanting to be limited to any scientific theory, it is presently believed that the phosphorous and/or sulfur moiety tends to interact with the metal layer either through chemisorption, complexation or other interaction.

The second region that interacts with the seal member 116 should be compatible with the makeup of the seal member 116, and may even chemically react with the seal member 116. In a presently preferred embodiment of the present invention, seal member 116 comprises epoxy, in which case the second region should be compatible and may even react with the epoxy backbone structure. The particular reactive functional group(s) employed for this second region is not critical, as long as they are not unstable so that they are destroyed by subsequent processing of an electrochromic device. In addition, the reactive functional group(s) in the cured seal member should not adversely interact with any of the components in the electrochromic medium 126.

In one embodiment of the present invention, this second region should be compatible with, but need not include groups that are reactive with, the seal member 116. In this embodiment, the first region will interact with the layer of metal and the second region may be an organic moiety that is compatible with the epoxy seal member and extend away from the reflector/electrode 120 and into the seal member 116 such that when the epoxy cures the part of the organic moiety that extends into the seal member 116 and anchors the seal member and therefore improves the adhesion of the seal member 116 to the layer of metal.

In another embodiment of the present invention, the second region of the adhesion promoter should be organic and contain any moiety capable of reacting with an epoxide group, or with the epoxy polymer, such as through the secondary hydroxide group present therein. This list may include at least one of the following reactive groups: acetals, acetoacetates, nitriles, alkynes, acid anhydrides, acyl halides, alcohols, aldehydes, alkyl halides, alkyl hydroperoxides, amides, primary, secondary and tertiary amines, 2-aminothiols, aryl dichloroarsines, carbamyl chloride, carboxylic acids, cyanates, cyanoacetates, epoxides, ethylene imines, halohydrins, ketones, malonates, metal alkoxides, phenols, phosphines, alkyl phosphonic acids, phthalimides, alkyl silicon halides, siloxanes, thiocyanates, thioacids, thiols and thionyl chlorides. In this case the second region actually bonds with the seal member 116 and therefore improves the adhesion of the seal member 116 to the reflector/electrode.

Thus, taken together, the first and second portions may have one of the following general formulas:

where n is an integer of 1 to 4, m is an integer of 1 or 2, and $R_1$ and $R_2$ can be the same or different and selected from the group comprising hydrogen; substituted and unsubstituted alkyl-, aryl-, aralkyl- or alkoxy-silane having a chain of 1–20 carbons which may be branched or straight, as well as amido and primary, secondary and tertiary amino derivatives thereof; substituted and unsubstituted alkyl-, aryl-, aralkyl- or alkoxy-phosphine having a chain of 1–20 carbons which may be branched or straight, as well as amido and primary, secondary and tertiary amino derivatives thereof; substituted and unsubstituted straight or branched alkyl chains having 1–20 carbons, as well as amido and primary, secondary and tertiary amino derivatives thereof; substituted and unsubstituted cyclic-, polycyclic-, heterocyclo-, hydroxyl-, or alkoxy-alkyl having a chain of 1–20 carbons which may be branched or straight, as well as amido and primary, secondary and tertiary amino derivatives thereof; substituted and unsubstituted aryl, or aralkyl having a chain of 1–20 carbons which may be branched or straight, as well as amido and primary, secondary and tertiary amino derivatives thereof. In addition, $R_1$ and $R_2$ can form a substituted or unsubstituted cyclic alkyl of 2–20 carbons, as well as alkyl-, alkenyl, amido and primary, secondary and tertiary amino derivatives thereof. If $R_1$ and $R_2$ are substituted, they are substituted with a member of the group comprising: acetals, acetoacetates, nitriles, alkynes, acid anhydrides, acyl halides, alcohols, aldehydes, alkyl halides, alkyl hydroperoxides, amides, primary, secondary and tertiary arnines, 2-aminothiols, aryl dichloroarsines, carbamyl chloride, carboxylic acids, cyanates, cyanoacetates, epoxides, ethylene imines, halohydrins, ketones, malonates, metal alkoxides, phenols, phosphines, alkyl phosphonic acids, phthalimides, alkyl silicon halides, siloxanes, thiocyanates, thioacids, thiols and thionyl chlorides.

More specifically, the adhesion promoter may be a compound selected from the group comprising one of the following general formulas:

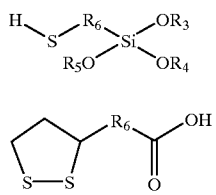

[III]

[IV]

where $R_3$, $R_4$ and $R_5$ can be the same or different and selected from the group comprising hydogen; substituted and unsubstituted straight or branched alkyl, aralkyl or alkoxyalkyl having 1–10 carbons; substituted and unsubstituted cyclic, polycyclic or heterocyclic, alkyl having 1–10 carbons, and $R_6$ is selected from the group comprising substituted and unsubstituted straight or branched alkyl or aralkyl having 1–14 carbons; or substituted and unsubstituted cyclic-, polycyclic-, heterocyclo-, or alkoxy-alkyl having 1–14 carbons.

$$H_2N-R_7-(S-)_m-R_8-NH_2 \quad [V]$$

where m is an integer from 1 to 4 and $R_7$ and $R_8$ are the same or different and are selected from the group comprising substituted and unsubstituted alkyl, aryl or aralkyl having a chain of 1–14 carbons which may be branched or straight; or substituted and unsubstituted cyclic-, polycyclic-, heterocyclo-, hydroxyl-, or alkoxy-alkyl having 1–14 carbons which may be branched or straight. If $R_7$ and $R_8$ are substituted then they are substituted with a member of the group comprising: acetals, acetoacetates, nitrites, alkynes, acid anhydrides, acyl halides, alcohols, aldehydes, alkyl halides, alkyl hydroperoxides, amides, primary, secondary and tertiary amines, 2-aminothiols, aryl dichloroarsines, carbamyl chloridie, carboxylic acids, cyanates, cyanoacetates, epoxides, ethylene imines, halohydrins, ketones, malonates, metal alkoxides, phenols, phosphines, phosphorous acid, phthalimides, alkyl silicon halides, siloxanes, thiocyanates, thioacids, thiols and thionyl chlorides.

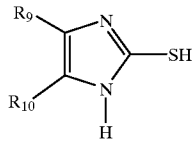

[VI]

where $R_9$ and $R_{10}$ are the same or different and are selected from the group comprising hydrogen; straight or branched alkyl, aryl and aralkyl having 1–14 carbons; or cyclic-, polycyclic-, heterocyclo-, hydroxyl-, or alkoxy-alkyl having 1–14 carbons. In addition, $R_9$ and $R_{10}$ can form a cyclic alkyl of 4–12 carbons or an aryl of 6 to 10 carbons.

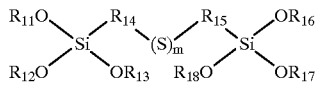

[VII]

where m is an integer from 1–4, and $R_{11}$, $R_{12}$, $R_{13}$, $R_{16}$, $R_{17}$ and $R_{18}$ can be the same or different and selected from the group comprising hydogen; substituted and unsubstituted straight or branched alkyl, aralkyl or alkoxyalkyl having 1–10 carbons; substituted and unsubstituted cyclic, polycyclic or heterocyclic alkyl having 1–10 carbons, and $R_{14}$ and $R_{15}$ is selected from the group comprising substituted and unsubstituted straight or branched alkyl or aralkyl having 1–14 carbons; or substituted and unsubstituted cyclic-, polycyelic-, heterocyclo-, or alkoxy-alkyl having 1–14 carbons.

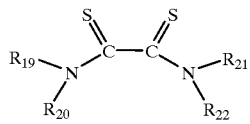

[VIII]

where $R_{19}$, $R_{20}$, $R_{21}$, and $R_{22}$ can be the same or different and selected from the group comprising hydrogen; substituted and unsubstituted straight or branched alkyl, aryl or aralkyl having 1–14 carbons, as well as amido and primary, secondary and tertiary amino derivatives thereof; substituted and unsubstituted cyclic-, polycyclic-, heterocyclo-, hydroxyl-, or alkoxy-alkyl having 1–14 carbons, as well as amido and primary, secondary and tertiary amino derivatives thereof.

Yet more specifically, the adhesion promoter may be a compound selected from the group comprising one of the following formulas:

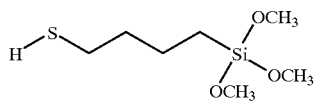

[IX]

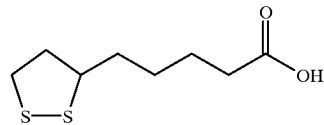

[X]

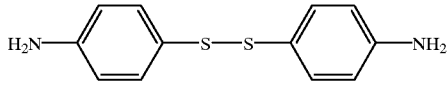

[XI]

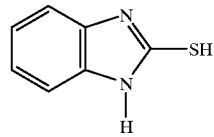

[XII]

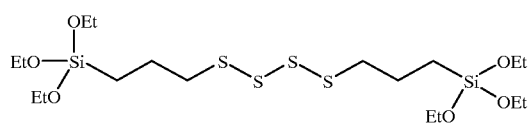

[XIII]

-continued

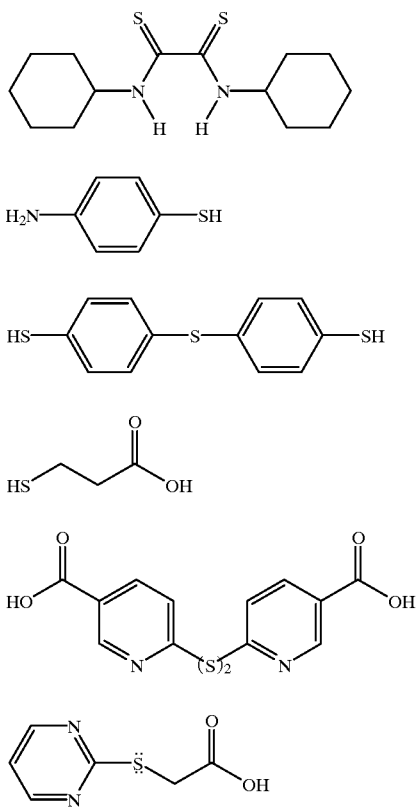

In any sealing or adhesive application it desirable to reduce the level of stress in the system for best results. The stress could arise from shrinkage of the seal member 116 as it cures, such as with UV cured acrylic materials or with solvent evaporation-cured materials. In addition, the stress can be generated by the thermal expansion differences between the sealing adhesive and the substrate(s) in thermally cured adhesive systems. Since the transparent elements (112 and 114) are generally based on glass and the seal member 116 is typically organic in nature, the thermal expansion mismatch is significant. For example, the coefficient of thermal expansion (CTE) for cast epoxy is typically about $2.5 \times 10^{-5}$ per degree Fahrenheit and borosilicate glass is around $1.8 \times 10^{-6}$ per degree Fahrenheit.

For thermally cured systems, it is desirable to cure the seal member 116 above its ultimate glass transition temperature in order to achieve full cure in a minimum amount of time. As a general rule, the glass transition temperature of the seal member should be well above the maximum expected service temperature for an application. Thus, for seal members used in automotive or outdoor architectural applications, adhesive glass transition temperatures of 130 to 150 degrees Celsius or above are not uncommon. If, however, the seal member 116 and substrates are heated to above these temperatures and then cooled, stress due to thermal mismatch between the seal member 116 and substrate(s) begins to develop when the temperature drops below the glass transition temperature of the seal member and the seal member becomes more rigid. At room temperature the stress induced by 125 degrees Celsius cooling the electrochromic device containing glass elements (112 and 114) and a seal member 116 having mismatched CTFs can be substantial. If the adhesive strength between the substrates and seal member 116 is compromised by contamination or other causes, premature bond failure can occur. The higher stress levels created by the CTE mismatch increase the likelihood that bond failure will occur.

In accordance with another aspect of the present invention, FIG. 3 shows an electrochromic window 310 having a seal member 116 comprising an inorganic filler 116a with a low or even negative CTE. By adding the inorganic filler 116a to the organic seal member 116 the total CTF of the seal member will be lowered. It should be understood that the electrochromic window 310 of FIG. 3 can also be an electrochromic mirror by placing a reflector on the third 114a or fourth surface 114b. In general, the higher the loading of inorganic filler the lower the CTE and the lower the stress in the final seal/substrate system. However, since adding inorganic filler increases the viscosity of the uncured seal member 116, there is a practical limit to how much filler can be added. In one hundred percent solids bis phenyl A epoxy resins, such as Shell 828, available from Shell Chemical Company, Houston, Tex., it is difficult to achieve filler loading over 40 to 50 percent with certain inorganic fillers while maintaining good dispensing or screen printing properties. This is not the case, however, when the inorganic filler used is in the shape of a small round, ellipsoid or aspherical bead. Surprisingly high filler loading can be achieved with moderate increases in viscosity because the rounded filler particles tend to roll over one another without snagging. In addition, because the beads are generally round, they can help with the milling or dispersion of the adhesion promoter when mixing during formulation. Below is a table outlining the amount of filler that can be loaded into Shell 828 to achieve a comparable viscosity (at room temperature) with fumed silica, clay and glass beads. As can be seen, the viscosity of Shell 828 without filler is 12,000 centipoise (cps) and approximately 3.5 parts by weight of fumed silica were added to produce a viscosity of 102,000 cps, whereas 35 parts by weight of Translink 77 clay filler, available from Engelhard Corporation, Edison, N.J., were added to produce a viscosity of 112,000 cps. In comparison, 157 parts by weight of Potters 4000 E glass beads, available from Potters Industries, Parsippany, N.J., were added to produce a viscosity of 104, 000 cps.

| Parts By Weight Shell 828 | Filler Type | Parts By Weight Filler | Viscosity (CPS) | Weight Percent Filler |
|---|---|---|---|---|
| 100 | None | 0 | 12,000 | 0 |
| 100 | Fumed Silica | 3.5 | 102,000 | 3% |
| 100 | Clay Filler | 35 | 112,000 | 26% |
| 100 | Glass Beads | 157 | 104,000 | 61% |

Thus, a very high loading of bead shaped inorganic filler 116a can be achieved to lower the CTE of the cured seal member 116 while maintaining low viscosity which enhances processability in the uncured state. As the table indicates, a loading of greater than 60 weight percent can be achieved, but improved results can be seen with as little as 40 weight percent of inorganic filler 116a, while still maintaining processability. More than twice the filler loading can be achieved with glass beads as compared to particulate fillers such as clay while holding the viscosity constant. Since the CTE of inorganic filler closely matches that of the glass substrate, the higher the filler content the more closely the CTE matches that of the glass substrates. For a given seal formulation, at least twice the filler loading can be achieved with beads while maintaining the same viscosity with a similar effect on cured seal CTE. With the teachings contained herein, one skilled in the art will understand that a filler must be chosen with a low CTE that is closer to the transparent substrate than to the seal member, or even a negative CTE. Inorganic fillers with low CTE include glass and zirconium silicate, and those with a negative CTE include zirconium molybdenum oxide ($ZrMo_2O_8$) and zirconium tungstate ($ZrW_2O_8$).

The filler bead size should be less than ⅔ the spacing of the transparent elements 112 and 114, and preferably, the bead size less than ½ the spacing of the transparent elements 112 and 114 and greater than about 0.5 microns. It is generally more preferred that the bead size be less than 20 microns. For electrochromic mirrors the spacing of transparent elements may range from 75 to about 300 microns but is generally between about 125 and 210 microns. For these mirrors, one commercially available filler 116a is Potters 4000E glass bead which have a diameter distribution between 9 microns and 20 microns. For electrochromic windows, the spacing of transparent elements may range from about 100 to about 3,000, but is generally between about 400 and 1, 200.

Referring, again to FIGS. 2a and 2b, chamber 125, defined by transparent conductor 128 (disposed on front element rear surface 112b), reflector/electrode 120 (for FIG. 2a), or layer 220 of metal (for FIG. 2b) and an inner circumferential wall 132 of sealing member 116, contains an electrochromic medium 126. Electrochromic medium 126 is capable of attenuating light traveling therethrough and may comprise electrochromic materials that are solid metal oxides, redox active polymers and hybrid combinations of solution-phase and solid metal oxides or redox active polymers; however, the above-described solution-phase design is typical of most of the electrochromic devices presently in use. In an all solution-phase medium, the electrochemical properties of the solvent, optional inert electrolyte, anodic materials, cathodic materials, and any other components that might be present in the solution are preferably such that no significant electrochemical or other chances occur at a potential difference which oxidizes anodic material and reduces the cathodic material other than the electrochemical oxidation of the anodic material, electrochemical reduction of the cathodic material and the self-erasing reaction between the oxidized form of the anodic material and the reduced form of the cathodic material.

For an electrochromic mirror, electrode layers 120 and 128 (or layers 220 and 128 for windows and light filters) are connected through clips 134a and 134b to electronic circuitry which is effective to electrically energize the electrochromic medium, such that when a potential is applied across the electrode layers 120 and 128, electrochromic medium 124 darkens such that incident light ($I_o$) is attenuated as the light passes toward the reflector/electrode 120 and as it passes back through after being reflected. By adjusting the potential difference between the transparent electrodes, such to a device can function as a "gray-scale" device, with continuously variable transmittance over a wide range. For solution-phase electrochromic systems, when the potential between the electrodes is removed or returned to zero, the device spontaneously returns to the same, zero-potential, equilibrium color and transmittance as the device had before the potential was applied. As stated above, other electrochromic materials are available for making electrochromic devices.

However, the presently preferred media are solution phase redox electrochromics, such as those disclosed in above-referenced U.S. Pat. Nos. 4, 902, 108; 5, 128, 799, 5, 278, 693; 5, 280, 380; 5, 282, 077; 5, 294, 376; 5, 336, 448. Co-pending U.S. patent application Ser. No. 08/832, 596, entitled "AN IMPROVED ELECTROCTROMIC MEDIUM CAPABLE OF PRODUCING A PRE-SELECTED COLOR" discloses electrochromic media that are perceived to be gray throughout their normal range of operation. The entire disclosure of this Application and these patents are hereby incorporated herein by reference. If a solution-phase electrochromic medium is utilized, it may be inserted into chamber 125 through a sealable fill port 142 through well known techniques, such as vacuum backfilling and the like.

For mirrors, an electrical circuit 150, such as those taught in the above-referenced Canadian Patent No. 1, 300945 and U.S. Pat. Nos. 5,204,778; 5, 34,407; and 5,451,822, is connected to, and allows control of the potential to be applied across, reflector/electrode 120 and transparent electrode 128 such that electrochromic medium 126 will darken and thereby attenuate various amounts of light traveling therethrough and thus vary the reflectance of the mirror containing electrochromic medium 126. For windows, the circuit may be DC wiring from a building or may be a photovoltaic cell disclosed and claimed in commonly assigned Ser. No. 08/616,698 entitled "Electro-Optic Window Incorporating A Discrete Photovoltaic Device and Apparatus For Making Same". This application is hereby incorporated herein in its entirety by reference.

The following illustrative examples are not intended to limit the scope of the present invention but to illustrate its application and use:

EXAMPLE 1

Electrochromic mirror devices incorporating a high reflectivity third surface reflector/electrode were prepared by sequentially depositing approximately 700 Angstroms of chromium, approximately 100 Angstroms of rhodium and approximately 500 Angstroms of silver on the surface of 2.2 mm thick sheets of flat soda lime glass cut into an automotive interior mirror element shape. The deposition was accomplished by passing said glass element shapes past separate metal targets in a magnetron sputtering system with a base pressure in the range of $10^{-6}$ torr and an argon pressure of approximately $3\times10^{-3}$ torr.

The glass/chrome/rhodium/silver automotive mirror shapes were used as the rear panel elements of an electrochromic mirror device. The front of the element was a sheet of TEC 15 transparent conductor coated glass from LOF cut similar in shape and size to the rear glass piece. The front and rear pieces were bonded together by an epoxy perimeter seal (composition and cure described below) with the conductive planar surfaces facing each other and parallel to each other with an offset. The spacing between the electrodes was about 137 microns with the width of the seal averaging about 0.11 inches about the perimeter. The devices were vacuum filled through a fill port left in the perimeter seal with an electrochromic solution made up of:

0.0265 molar 5, 10-dihydro-5-10-dimethylphenazine 0.034 molar 1, 1'-di(3-pheny)(n-propane))-4, 4'-bipyridinium di(tetrafluoroborate)

0.030 molar 2-(2'-hydroxy-5'methylphenyl)-benzotriazole in a solution of 3 weight percent Elvacite™ 2051 polymethylmethacrylate resin dissolved in propylene carbonate.

The fill port was plugged with a UV cure adhesive which was cured by exposure to UV light.

A one step thermal cure epoxy resin was prepared as follows: A base resin (90% of a multifunctional epoxy novolac resin (D.E.N. 431 by Dow Corning Corporation) and 10% by weight of a fumed silica having its surface modified with a silane or silicone oil (US 206 by DeGussa)) and additives of an aliphatic amine curing agent (Ancamine 2049 by Air Products and Chemicals) and a silane (A-1120 by Union Carbide) and 137 um glass beads were vacuum mixed in a planetary mixer in a ratio such that the glass beads comprised 1% of the final resin mixture (by weight), the silane comprised ½% of the final resin mixture and the amine curing agent comprised 36% of the final resin mixture. This resin mixture will be referred to as 1A.

Another resin mixture, which will be referred to as 1B was prepared in the same way as 1A except that the final resin mixture contained 2% by weight of 4-Aminophenyl disulfide $(H_2NC_6H_4)_2S_2$.

Perimeter seals made with resins 1A and 1B were cured thermally at 160–170 degrees Celsius for approximately 10 minutes.

Electrochromic elements manufactured by the method described above with either resin 1A or 1B were subjected to pressurized steam testing as follows: a steam autoclave (Wisconsin Aluminum Foundry) containing these elements was sealed and allowed to come to boiling temperature with a pressure relief valve open, and was purged in this condition so that water vapor was the primary gas remaining in the autoclave, the valve was then shut and the unit was allowed to stabilize in a condition where the pressure was maintained at between 10 and 15 psig (240–250 F) for approximately 20 hours, the unit was then allowed to cool, was opened and the elements were examined for failure of the seal system of the element as evidenced by loss of electrochromic fluid. This constitutes one cycle, or day, for this test. The number of cycles an element endures before failure is referred to as "days to fail".

Durability results are presented in median days to fail in the steam autoclave test. The number of elements in the group are in parentheses after the median value.

|                    | Resin 1A | Resin 1B |
|--------------------|----------|----------|
| Median days to fail | 4 (10)   | 12 (11)  |

EXAMPLE 2

Electrochromic elements were made by the same methods as example 1 with the following modifications:

The silver of the $3^{rd}$ surface reflector was replaced with one of the following three alloys:

3% palladium in silver (to be designated 3% Pd in Ag)
6% platinum in silver (to be designated 6% Pt in Ag)
15% gold in silver (to be designated 15% Au in Ag)

The epoxy resin systems were modified as follows: The base resin was comprised of 93% by weight D.E.N. 431 and 7% of a different surface modified fumed silica (TS 720 from Cabot) that has been vacuum mixed in a planetary mixer prior to the addition of other materials. As per the final resins in example 1 the final resins of example 2 all contain (by weight) 1% 137 um glass beads, ½% aminosilane (A-1120) and 36% amine curing agent (Ancamine 2049).

The differences in the final resins of example 2 are as follows:
Resin 2A-no other additives
Resin 2B-½% (by weight) mercaptopropyl trimethoxy silane
Resin 2C-2% thioctic acid
Resin 2D-2% DeGussa SI 69 $((EtO_3)-Si-(CH_2)_3-(S-S)_2)_2$
Resin 2E-2% 4-aminophenyl disulfide
The seal widths were approximately 0.08".

Results of the durability testing, in median of days to fail in the steam autoclave test, as described in example 1, of elements made with these materials variations are in the table below. The number of elements in the test group again follows the median value in parentheses.

|          | 3% Pd in Ag | 6% Pt in Ag | 15% Au in Ag |
|----------|-------------|-------------|--------------|
| Resin 2A | 5.5 (8)     | 5 (9)       | 3 (5)        |
| Resin 2B | 6 (11)      | 4.5 (12)    | 6 (12)       |
| Resin 2C | 5.5 (8)     | >15 (10)    | 4.5 (8)      |
| Resin 2D | 7.5 (10)    | >13 (4)     | >15 (10)     |
| Resin 2E | >14.5 (10)  | >15 (10)    | >15 (9)      |

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic device, comprising front and rear spaced elements, each having front and rear surfaces, said rear surface of said front element having a layer of transparent conductive material disposed thereon, said front surface of said rear element having a layer of metal disposed thereon, said device further comprising a seal member bonding said front and rear spaced elements together in a spaced-apart relationship to define a chamber containing an electrochromic medium, said seal member comprising a sealing system and glass beads having an average diameter that is less than ⅔ of the dimension that said front and rear elements are spaced apart.

2. The electrochromic device of claim 1, where said glass beads are present in an amount sufficient to lower the coefficient of thermal expansion of said seal member, while allowing said seal member, in its uncured state, to be easily dispensed or screen printed.

3. The electrochrornic device of claim 2, where said amount is greater than about 40 percent by weight of said seal member.

4. The electrochromic device of claim 2, where said glass bead dimension is less than ½ the dimension that said front and rear elements are spaced apart and greater than about 0.5 microns.

5. The electrochromic device of claim 2, where said glass bead dimension is less than about 50 microns.

6. An electrochromic device, comprising front and rear spaced elements, each having front and rear surfaces, said rear surface of said front element having a layer of transparent conductive material disposed thereon, said front surface of said rear element having a layer of metal disposed thereon, said device further comprising a seal member bonding said front and rear spaced elements together in a spaced-apart relationship to define a chamber containing an electrochromic medium, said seal member comprising a sealing system and an inorganic filler, where the amount of said filler is greater than about 40 weight percent of said seal member.

7. The electrochromic device of claim 6, where said inorganic filler has a negative coefficient of thermal expansion.

8. The electrochromic device of claim 7, where said glass bead dimension is less than ½ the dimension that said front and rear elements are spaced apart and greater than about 0.5 microns.

9. The electrochromic device of claim 7, where said glass bead dimension is less than about 50 microns.

10. The electrochromic device of claim 6, where said amount is greater than about 40 percent by weight of said seal member.

11. The electrochromic device of claim 10, where said amount is greater than about 60 percent by weight of said seal member.

12. An electrochromic device, comprising front and rear spaced elements, each having front and rear surfaces, said rear surface of said front element having a layer of transparent conductive material disposed thereon, said front surface of said rear element having a layer of metal disposed thereon, said device further comprising a seal member bonding said front and rear spaced elements together in a spaced-apart relationship to define a chamber containing an electrochromic medium, said seal member comprising a sealing system and an inorganic filler, where said inorganic filler has a negative coefficient of thermal expansion.

13. The electrochromic device of claim 12, where said amount is greater than about 40 percent by weight of said seal member.

14. The electrochromic device of claim 13, where said amount is greater than about 60 percent by weight of said seal member.

15. The electrochromic device of claim 12, where said inorganic filler is beads and where the average dimension of said beads is less than ⅔ of the dimension that said front and rear spaced elements are spaced apart.

16. The electrochromic device of claim 15, where said bead dimension is less than ½ the dimension that said front and rear elements are spaced apart and greater than about 0.5 microns.

17. The electrochromic mirror of claim 16, where said bead dimension is less than 20 microns.

18. An electrochromic device, comprising front and rear spaced elements, each having front and rear surfaces and a seal member bonding said front and rear spaced elements together in a spaced-apart relationship to define a chamber that contains an electrochromic medium, where said device has means for applying a potential to said electrochromic medium, and where said seal member comprises inorganic filler beads having an average diameter that is less than ⅔ of the dimension that said front and rear elements are spaced apart.

19. The electrochromic device of claim 18, further including inorganic filler beads having an average diameter that is less than ½ the dimension that said front and rear elements are spaced apart.

20. The electrochromic device of claim 19, further including inorganic filler beads having an average diameter that is less than about 50 microns.

21. The electrochromic device of claim 18, further including inorganic filler beads having an average diameter that is less than about 50 microns.

22. An electrochromic device, comprising front and rear spaced elements, each having front and rear surfaces, and a seal member bonding said front and rear spaced elements together in a spaced-apart relationship to define a chamber that contains an electrochromic medium, where said device has means for applying a potential to said electrochromic medium, and where said seal member comprises an inorganic filler, where the amount of said filler is greater than about 40 weight percent of said seal member.

23. The electrochromic device of claim 22, where said inorganic filler has a low or negative coefficient of thermal expansion.

* * * * *